United States Patent [19]

Hatwar et al.

[11] Patent Number: 5,361,248
[45] Date of Patent: Nov. 1, 1994

[54] DIRECT OVERWRITE MAGNETO-OPTICAL STORAGE MEDIUM NOT REQUIRING AN INITIALIZATION MAGNET

[75] Inventors: Tukaram K. Hatwar, Penfield; David J. Genova; Randall H. Victora, both of Rochester, all of N.Y.

[73] Assignee: Eastman Kodak Company, Rochester, N.Y.

[21] Appl. No.: 891,130

[22] Filed: Jun. 1, 1992

[51] Int. Cl.$^5$ .............................................. G11B 7/26
[52] U.S. Cl. ..................... 369/275.2; 369/13; 369/110; 369/288; 360/59; 428/694 R; 428/900
[58] Field of Search ................ 369/13, 100, 110, 286, 369/288, 275.2; 360/59, 114; 428/900, 694

[56] References Cited

U.S. PATENT DOCUMENTS

| | | | |
|---|---|---|---|
| 4,649,519 | 3/1987 | Sun et al. | 365/122 |
| 4,672,187 | 6/1987 | Fujita et al. | 250/201 |
| 4,679,180 | 7/1987 | Kryder et al. | 369/13 |
| 4,807,204 | 2/1989 | Mizutani et al. | 369/13 |
| 4,855,975 | 8/1989 | Akasaka et al. | 369/13 |
| 4,868,803 | 9/1989 | Sunagawa et al. | 369/44 |
| 4,878,132 | 10/1989 | Aratani et al. | 360/59 |
| 4,882,231 | 11/1989 | Aratani | 428/611 |
| 4,882,718 | 11/1989 | Kryder et al. | 369/13 |
| 4,883,710 | 11/1989 | Machida | 428/336 |
| 4,888,750 | 12/1989 | Kryder et al. | 369/13 |
| 4,893,910 | 1/1990 | Birecki | 350/377 |
| 4,910,622 | 3/1990 | Saito et al. | 360/131 |
| 4,922,454 | 5/1990 | Taki | 365/122 |
| 4,945,525 | 7/1990 | Yamamoto et al. | 369/44.12 |
| 4,950,556 | 8/1990 | Willson et al. | 428/694 |
| 4,992,338 | 2/1991 | Hatwar et al. | 428/900 |
| 5,069,984 | 12/1991 | Hatwar et al. | 369/288 |
| 5,132,945 | 7/1992 | Osato et al. | 369/13 |
| 5,175,714 | 12/1992 | Kikitsu et al. | 369/13 |
| 5,191,561 | 3/1993 | Fukami et al. | 369/13 |
| 5,191,564 | 3/1993 | Hosokawa | 369/13 |
| 5,199,014 | 3/1993 | Homburg et al. | 369/44.15 |
| 5,204,193 | 4/1993 | Sato et al. | 369/13 |
| 5,208,797 | 5/1993 | Nakaki et al. | 369/13 |
| 5,210,724 | 5/1993 | Kobayashi | 369/13 |

FOREIGN PATENT DOCUMENTS

| | | |
|---|---|---|
| 88310628.8 | 11/1988 | European Pat. Off. . |
| 428271-A | 5/1991 | European Pat. Off. . |
| 61-239652 | 10/1986 | Japan . |
| 64-50257 | 2/1989 | Japan . |

OTHER PUBLICATIONS

Shinji Takayama, Teruhisa Shimizu, Soichi Owa, and Hiroshi Tanaka, Entitled: Direct Overwriting Capability in TM-Rich Side Rare-Earth Transition Metal Amorphous Films, American Institute of Physics, Applied Physics Letter 56(26), Jun. 25, 1990, pp. 2690-2692.

(List continued on next page.)

Primary Examiner—Paul M. Dzierzynski
Assistant Examiner—Kim-Kwok Chu
Attorney, Agent, or Firm—Raymond L. Owens

[57] ABSTRACT

A storage medium for use in a magneto-optical information storage medium does not require an initializing magnet. In one embodiment of the medium, a structure includes a memory layer, in which the orientation of magnetic regions perpendicular to the memory layer surface defines the data stored in the memory layer, a reference layer, and an intermediate layer, the intermediate layer mediating an exchange coupling between the memory layer and the reference layer. The combined properties of the storage medium provide a temperature at which, in the presence of a bias magnetic field, data stored in the medium in the form of oriented magnetic domains can be overwritten. In a second embodiment of the invention, a storage medium has two layers, a memory layer and a under layer, of materials with selected magnetic properties. The magnetic properties of the layers are selected to provide magneto-optical storage medium with direct overwriting capability, the operation of the storage medium not requiring an intialization magnet.

23 Claims, 7 Drawing Sheets

OTHER PUBLICATIONS

Han-Ping D. Shieh and Mark H. Kryder, Entitled: Magneto-Optic Recording Materials With Direct Overwrite Capability, American Institute of Physics, Applied Physics Letter 49(8), Aug. 25, 1986, pp. 473–474.

T. Ohtsuki, S. Owa, and F. Yamada, Entitled: Through-Thickness Temperature Gradients In Double-Layered Magneto-Optical Media For Direct Overwrite, American Institute of Physics, Applied Physics Letter 57(2), Jul. 9, 1990, pp. 105–107.

Magneto Optic Recording Erase Method, IBM Technical Disclosure Bulletin, vol. 29, No. 5, p. 1093, Oct. 1986.

A. M. Stoffel, Entitled: Thin-Film Magneto-Optic Read-Write Memory Element, IBM Technical Disclosure Bulletin, vol. 12, No. 1, pp. 209–210, Jun. 1969.

T. Ohtsuki, C. J. Lin, and F. Yamada, Entitled: Direct Overwrite Using Through-Thickness Temperature Gradients, IEEE Transactions On Magnetics, vol. 27, No. 6, pp. 5109–5111, Nov. 1991.

Han-Ping D. Shieh and Mark H. Kryder, Entitled: Operating Margins For Magneto-Optic Recording Materials With Direct Overwrite Capability, IEEE Transactions On Magnetics, vol. AG-23, No. 1, pp. 171–173, Jan. 1987.

Overwrite System Of Magneto Optical Disk System, Nippon Kogaku K.K., Information Storage Products Division, Sep., 1987.

Yukinori Saito and Shinji Suganomata, Entitled: Coloration of $LiNbO_3$ by Metal Ion Implantation, Japanese Journal Of Applied Physics, vol. 26, No. 11, pp. 1941–1942, Nov. 1987.

Jun Saito, Masatoshi Sato, Hiroyuki Matsumoto, Hideki Akasaka, Entitled: Direct Overwrite By Light Power Modulation On Magneto-Optical Multi-Layered Media, Japanese Journal Of Applied Physics, vol. 26, Supplement 26-4, pp. 155–159, 1987, Sep. 1987.

Toshikazu Tanaka, Etsuko Kanayama, Taku Katahira, Ichiro Saito, Kazushige Kawazoe and Haruko Masuya, Entitled: Effect of a Ti Interlayer in Evaporated Co-CR/Fe-Ni Double-Layer Film, Japanese Journal Of Applied Physics, vol. 26, No. 12, pp. 2051–2056, Dec. 1987.

Hachiro Nakanishi Shuji Okada, Hiro Matsuda, Masao Kato, Michio Sugi, Misuyoshi Saito, Sigeru Iizima, Entitled: Fabrication Of Polar Structures By Use Of LB Technique, Japanese Journal Of Applied Physics, vol. 26, No. 10, pp. 1622–1624, Oct. 1987.

Noboru Fokuoka, Minoru Yoneta, Reiko Miyamura, Haruo Saito, Entitled: Nature Of Oxygen Donor In Czochralski-Grown Silicon, Japanese Journal Of Applied Physics, vol. 26, No. 2, pp. 197–201, Feb. 1987.

Tatsuya Fukami, Yoshiyuki Nakaki, Takashi Tokunaga, Motohisa Taguchi, Kazuhiko Tsutsumi, Hiroshi Sugahara, Entitled: A New Direct Overwrite Method By Light Intensity Modulation With Milti Layered Magneto-Optical Discs, Japanese Journal Of Applied Physics, vol. 28, Supplement 28-3, pp. 371–374, Sep. 1989.

Terou Saito, Hirotaka Masabayashi, Tsuyoshi Kariya, Yasuhito Kiwamoto, Syoichi Miyoshi, Entitled: Mode—Selective Directional Coupler For High Power Microwave Measurements, Japanese Journal Of Applied Physics, vol. 26, No. 8, pp. 1392–1393, Aug. 1987.

Haruhisa Iida, Hiroyuki Matsumoto, Jun Saito, Masatoshi Sato, Hideki Akasaka, Entitled: Recording Power Characteristics of 130 mm Overwritable MO Disk By Laser Power Modulation Method, Japanese Journal Of Applied Physics, vol. 28, Supplement 28-3, pp. 367–370, Sep. 1989.

Shigeru Saito, Entitled: Temperature And Magnetic Effects On The Work Function Of A Ni(100) Surface, Japanese Journal Of Applied Physics, vol. 26, No. 11, pp. 1838–1843, Nov. 1987.

Shinji Takayama, Teruhisa Shimizu, Hiroshi Tanaka, Entitled: Direct Overwrite Capability In Transition-Metal-Rich Side Rare—Earth Transition Amorphous Films (Abstract), American Institute of Physics, Journal of Applied Physics 67(9), p. 4447, May 1, 1990.

Y. Hashimoto, K. Nakishima, M. Maeda, H. Inoue, S. Ogawa, Entitled: Direct Overwriting Capability Of Magneto-Optical Disks, American Institute Of Physics, Journal Of Applied Physics 67(9), pp. 4420–4422, May 1, 1990.

T. Fukami, Y. Nakaki, T. Tokunaga, M. Taguchi, K. Tsutsumi, Entitled: Novel Direct Overwriting Technology For Magneto—Optical Disks By Enchange—coupled RE-TM Quadrilayered Films, American

OTHER PUBLICATIONS

Institute Of Physics, Journal Of Applied Physics 67(9), pp. 4415–4416, May 1, 1990.

M. D. Schultz, H.-P. D. Shieh, M. H. Kryder, Entitled: Performance Of Magneto—Optical Recording Media With Direct Overwrite Capability, American Institute Of Physics, Journal Of Applied Physics 63(8), pp. 3844–3846, Apr. 15, 1988.

Katsuhisa Aratani, Atsushi Fukumoto, Masumi Ohta, Masahiko Kaneko, Kenjirou Wantanabe, Entitled: Magnetically Induced Super Resolution In Novel Magneto—Optical Disk, SPIE-The International Society For Optical Engineering, vol. 1499 Optical Data Storage '91, pp. 209–215, Feb. 25–27, 1991.

K. Aratani, M. Kaneko, Y. Mutoh, K. Watanabe, H. Makino, Entitled: Overwriting On A Magneto-Optical Disk With Magnetic Triple Layers By Means Of The Light Intensity Modulation Method, SPIE, vol. 1078, Optical Data Storage Topical Meeting, pp. 258–264, Jan. 1989.

Atsishi Fukumoto, Katsuhisa Aratani, Shunji Yoshimura, Toshiki Udagawa, Masumi Ohta, Masahiko Kaneko, Entitled: Super Resolution In A Magneto—Optical Disk With An Active Mask, SPIE-The International Society For Optical Engineering, vol. 1499, Optical Data Storage '91, pp. 216–225, Feb. 25–27, 1991.

DIRECT OVERWRITE MAGNETO-OPTICAL STORAGE MEDIUM NOT REQUIRING AN INITIALIZATION MAGNET

BACKGROUND OF THE INVENTION

1. Field of Invention

This invention relates generally to optical information storage systems for the storage and retrieval of information and, more particularly, to an information storage medium for use in an optical storage system making use of magneto-optical materials for the storage of information. Magneto-optical materials can be used in optical storage disks in which new data can be written over locations on which data has already been stored.

2. Description of the Related Art

The optical information storage systems of the type generally referred to as magneto-optical storage systems are of particular interest because of the ability to alter or over-write information already stored on the medium. In these systems, a magnetic medium exhibiting the Kerr effect is used to store information. The Kerr effect provides that magnetic materials having a component of magnetic orientation parallel to a direction of impinging radiation will affect circularly polarized reflected radiation depending upon whether the magnetic orientation is parallel or anti-parallel to the direction of impinging radiation. With the proper optical components, the change in circularly polarized radiation can be used to provide a change in planar polarized radiation. Although the difference in the rotation of the plane of polarization is typically less than 2°, this difference has been found to be sufficient to provide a basis for an optical storage and retrieval system. In optical storage systems of this type, the orientation of a region of magnetic material in one direction represents a first logical state while the orientation of a region of magnetic material in the opposite direction represents a second logical state.

In an optical storage medium, one desirable characteristic is the ability to write directly on the storage medium without the requirement of preliminarily erasing the data already stored on the disk.

Various techniques and materials have been proposed for implementing the direct overwriting of magneto-optical disks. For example U.S. Pat. No. 4,882,718, U.S. Pat. No. 4,679,180, and European Patent 316,188, all issued to H. P. D. Shieh et al; Appl. Phys. Lett. 49, 473 (1986) by H. P. D. Shieh et al; J. Appl. Phys. Lett. 67, 447 (1990) by Takayama et al; J. Appl. Phys. 67, 4420 (1990) by Hashimoto et al. describes single layer direct overwrite techniques. At the present, the single layer direct overwrite technique provides a relatively low signal-to-noise ratio. In U.S. Pat. No. 4,855,975, Jpn. J. Applied Phys. 26, (1987), and JP. 86,239,652, all being disclosed by J. Saito et al., a storage technique having two laminated magneto-optical layers provides that the memory layer has a high room temperature coercivity and a low Curie temperature; while the reference layer has a low room temperature coercivity and a high Curie temperature. The storage medium requires two magnets, a low field bias magnet for writing/erasing, and a high field magnet for initializing the reference layer. By modulating the intensity of the laser radiation beam between low and high power levels, information can be recorded while simultaneously erasing prestored information. In Jap. J. Appl. Phys. 28, Suppl. 28-3, p. 367 (1989) by Iida et al., a two layer read write scheme is described. In the two layer storage media, the two magneto-optical layers are strongly exchange coupled and require a large initializing field, typically greater than 5.5 kOe. In "Optical Data Storage" J. Appl. Phys. 67, 4415 (1990) by K. Aratani et al., a trilayer storage structure has been proposed, at least in part to reduce the strength of the initializing field. However, even this structure requires an initializing magnet of more than 3 kOe.

More recently, a direct overwrite structure has been described in which the initializing field has been eliminated, cf. Jpn. J. Appl. Phys. 28-3, (1990) 371, by T. Fukami et al. In this structure, the reference layer has a much higher Curie temperature ($>400°$ C.) than the memory layer Curie temperature ($=190°$ C.). The reference layer is initialized after fabrication (i.e., deposition) and the magnetization of this layer does not reverse, even during recording, because of the high Curie temperature. However, the overwriting performance is not disclosed. In J. Appl. Phys, 67 (1990) 4415 by T. Fukami, a four layer structure is disclosed which includes a memory layer, writing layer, switching layer, and initializing layer. The disclosed structure requires only a bias magnet for writing/overwriting.

In the article entitled Direct Overwrite Using Through Thickness Temperature Gradient, IEEE Transactions on Magnetics, Vol. 27, No. 6, November, 1991, T. Ohtsuk et al describe a direct overwrite storage structure using two magnetic layers. The reference layer retains a constant magnetic orientation during an operation of the structure. The implementation described in this reference also requires that the two layers each have a high magnetic anisotropy.

In the field of magneto-optical materials, a need has been felt for a ever increasing density for stored data. Recently, A. Fukumoto et al, SPIE Proceedings, Vol. 1499, page 216, (1991), and K. Aratani et al, SPIE Proceedings, Vol. 1499, page 209, (1991) have reported high resolution (sometimes referred to as super-resolution) media. The reported media has much higher bit densities than the conventional single layer magneto-optical disk. This disk requires an initializing magnet in addition to a regular write magnet. Finally this media does not have the direct over write capability.

In U.S. Pat. No. 4,649,519, entitled "Self Biasing Thermal Magneto-optical Medium", issued in the name of Sun et al., self-biasing magneto-optical storage structure is described. In the Sun reference, the interaction between the magnetically active layers is through a magnetic field and not by exchange coupling of the layers. In addition, the implementation disclosed by this reference requires the under layer to have a compensation point.

A need has been felt for a relatively simple magneto-optical structure or medium having the capability of directly overwriting already stored information and which does not require an initialization magnet for the operation.

SUMMARY OF THE INVENTION

It is an object of the present invention to provide an improved magneto-optical storage medium or structure.

It is a feature of the present invention to provide a magneto-optical storage medium having a capability for directly overwriting stored information, the operation of the medium not requiring an initialization magnet.

It is another feature of the present invention to provide a direct overwrite magneto-optical storage medium having three magnetic layers.

It is yet another feature of the present invention to provide a direct over write, magneto-optical medium having two magnetic layers.

The present invention is directed to overcoming one or more of the problems set forth above. Briefly summarized, according to one aspect of the present invention, the magneto-optical storage medium is comprised of three layers of magnetic material, a memory layer, a middle layer and a reference layer. The memory layer has a Curie temperature, $T_{cm}$, that is greater than or approximately equal to the reference layer Curie temperature $T_{cr}$. The room temperature coercivity of the memory layer is higher than the room temperature coercivity of the reference layer. The intermediate layer has a relatively small anisotropy and has a higher Curie temperature than either the memory layer or the reference layer. The magnetic exchange interaction between the memory layer and the reference layer is mediated by the intermediate layer, results in combined storage medium properties. The thickness and composition of the reference layer is chosen so that the combined system has a compensation temperature above the ambient operating temperature, but below the temperature, $T'_w$. ($T'_w$ is the highest temperature for which the coercivity of the wall motion for the multi-layer medium exceeds the bias magnetic field). The resulting storage medium can be overwritten using a bias magnet and two selected energy level. An initialization magnet is not required for operation of the medium as a storage device.

According to another aspect of the present invention, a magneto-optical storage medium includes only a memory layer and an under layer. The Curie temperature of the under layer is higher than the Curie temperature of the memory layer. However, the room temperature coercivity of the memory layer is higher. The thickness and the composition of the under layer are chosen such that the combined system has a compensation temperature above the ambient operating temperature, but below the temperature, $T'_w$. (Here again, $T'_w$ is the highest temperature for which the coercivity of the wall motion of the multi-layer medium exceeds the bias magnetic field). The storage medium has combined properties which permit, in addition to the writing and storage of information, a direct over-writing capability without the requirement for a initialization magnet.

These and other aspects, objects, features and advantages of the present invention will be more clearly understood and appreciated from a review of the following detailed description of the preferred embodiments and appended claims, and be referenced to the accompanying drawings.

BRIEF DESCRIPTION OF THE DRAWINGS

FIG. 6A is a spectrum analyzer plot of the signals read from data written on a three (magnetic material) layer storage medium, while

DESCRIPTION OF THE PREFERRED EMBODIMENTS

1. Detailed Description of the Figures

Figure 1:
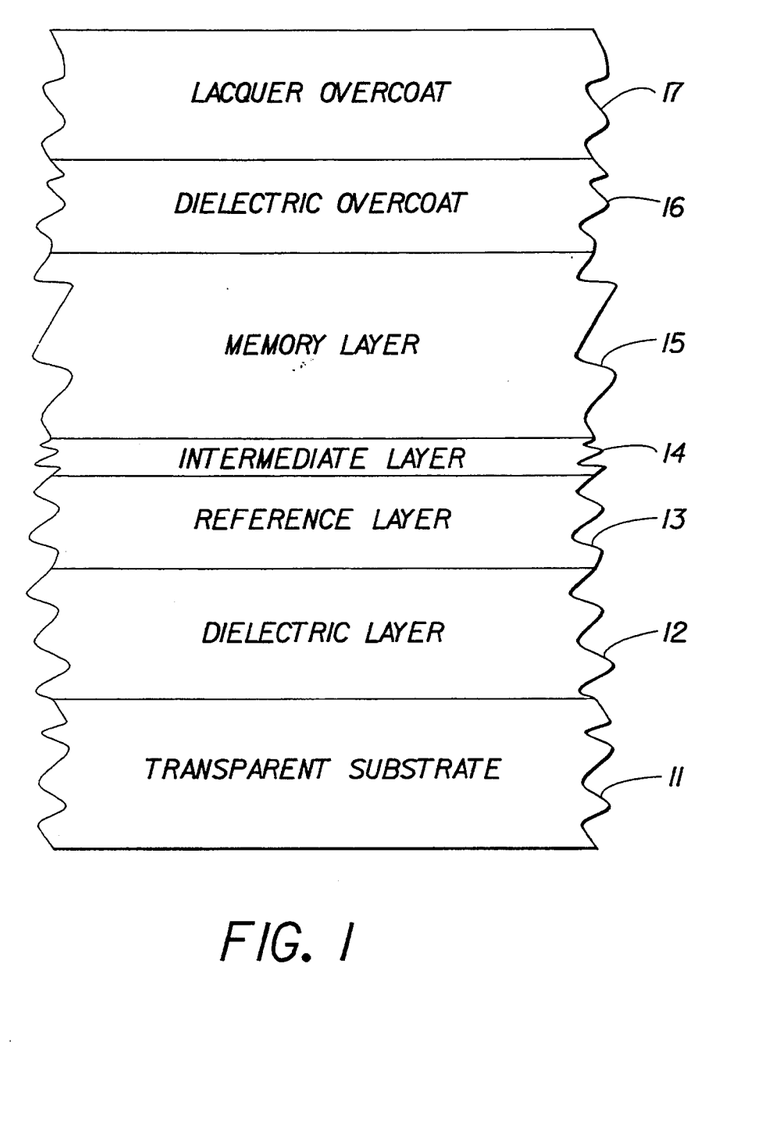
FIG. 1 is a cross section diagram of a storage medium according to one embodiment of the present invention.

Referring to FIG. 1, the storage structure, according to the present invention, provides a direct overwrite magneto-optical medium which does not require a initializing field. A transparent substrate layer 11 provides a substrate for the structure 10. The substrate 11 is selected to permit the radiation interacting with the magnetically and optically active portions of the storage structure to pass therethrough. Proximate the transparent substrate is a dielectric layer 12, and proximate the dielectric layer 12 is a reference layer 13. An intermediate layer 14 is positioned between the reference layer 13 and a memory layer 15. A second dielectric layer 16 separates the memory layer 15 and a lacquer layer 17.

The following are examples of the storage structures according to the first embodiment. In a first example of the first embodiment, the memory layer 15 is comprised of a $Tb_{25}Fe_{65}Co_{10}$ material having a thickness of 1300 Å, a Curie temperature of 225° C., and a compensation temperature of 30° C. The intermediate layer is comprised of a $Gd_{35}Fe_{22}Co_{43}$ material having a thickness of 100 Å and a Curie temperature of 350° C. The reference layer is comprised of a $Tb_{27}Fe_{54}Co_9Zr_{10}$ material having a thickness of 400 Å and a Curie temperature of 110° C. The bias magnetic field is $-350$ Oe. The combined system has a combined compensation temperature, $T_{combined}$, of 80° C. and an estimated write temperature, $T_w$, of 200° C. for this bias magnetic field. In the second example, the memory layer is comprised of a $Tb_{24}Fe_{62}Co_9Zr_5$ material having a thickness of 1300 Å, a Curie temperature of 175° C., and a compensation temperature of 30° C. The intermediate layer 14 is comprised of $Gd_{35}Fe_{26}Co_{39}$ material having a thickness of 100 Å and having a Curie temperature of 250° C. The reference layer is a $Tb_{30}Fe_{60}Co_{10}$ material having a thickness of 400 Å and a Curie temperature of 175° C. The bias field is $-460$ Oe. The combined compensation temperature for the storage structure, $T_{combined}$, is 70° C. and the estimated write temperature, $T_w$, is 150° C. for this bias magnetic field. According to a third example, the memory layer is a $Tb_{24}Fe_{62}Co_9Zr_5$ material having a thickness of 600 Å, a Curie temperature of 175° C., and a compensation temperature of 30° C. The intermediate layer is comprised of a $Gd_{35}Fe_{22}Co_{43}$ material having a thickness of 100 Å and having a Curie temperature of 350° C. The reference layer is comprised of a $Tb_{27}Fe_{54}Co_9Zr_{10}$ material having a thickness of 600 Å and having a Curie temperature of 110° C. The bias field for this storage structure is $-175$ Oe. For this storage structure, the combined material compensation temperature, $T_{combined}$ is 100° C. and the estimated write temperature, $T_w$, is 150° C. for this bias magnetic field.

Figure 2:
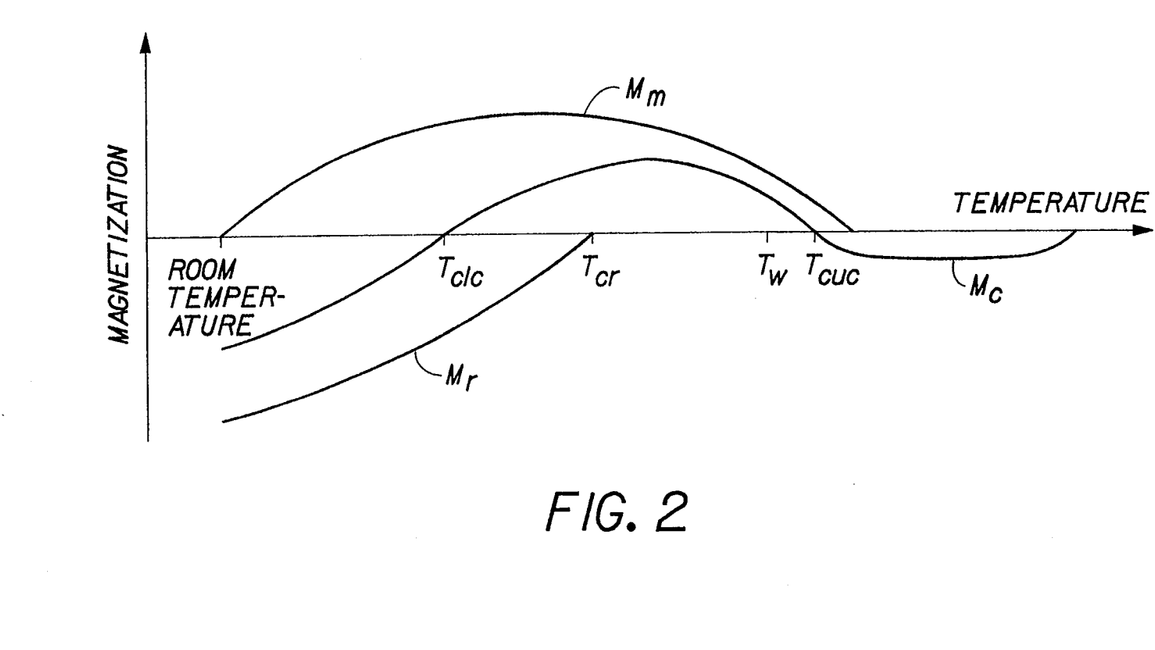
FIG. 2 is a graph illustrating the magnetization of the storage medium of FIG. 1.

Referring to FIG. 2, a plot of the magnetization of the memory layer, $M_m$, having a Curie temperature, $T_{cm}$ and of the reference layer, $M_r$, having a Curie temperature, $T_{cr}$, are shown for the storage structure according to the first embodiment. A combined magnetization, $M_c$, i.e., the combination of the magnetization for the memory layer, $M_m$, the magnetization for the reference layer, $M_r$, and a small contribution from the intermediate layer is shown. Because of the interaction between the memory and the reference layer, a combined magnetization curve, $M_c$, results which describes the magnetization of the storage medium as a function of temperature. In particular, the interacting layers have an upper and lower combined compensation temperature, $T_{cuc}$ and $T_{clc}$, which are essential for the operation of the storage medium. An approximate location for the write temperature, $T_w$, (which must exceed the highest temperature at which the coercivity for domain wall motion is above the bias field) is indicated in FIG. 2. The write temperature, $T_w$, is a function of the bias field and the thickness of the layers.

Figure 3:
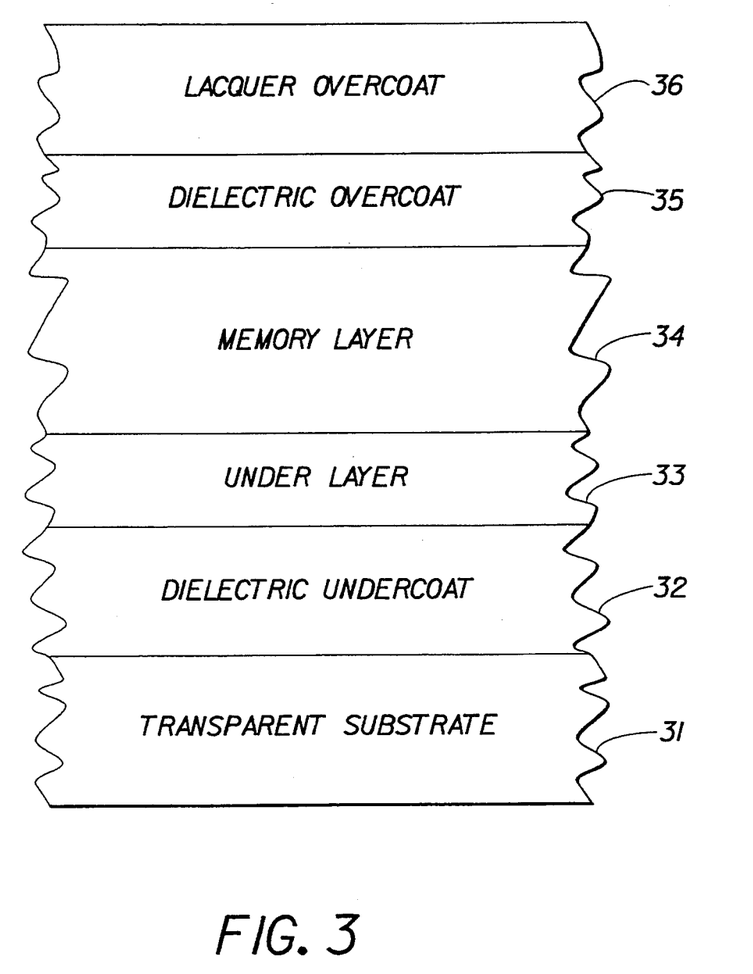
FIG. 3 is a cross-section diagram of a second embodiment of the present invention.

Referring to FIG. 3, a cross-sectional diagram of the storage medium of the second embodiment of the present invention is shown. The optical storage medium for the second embodiment has two interacting magnetic layers. The transparent substrate 31 is positioned next to the dielectric undercoat 32. The under layer 33 is positioned between the dielectric undercoat 32 and the memory layer 34. A dielectric overcoat layer 35 is positioned proximate the memory layer 34. A lacquer overcoat layer 36 can be applied to protect the storage medium.

In one implementation of the second embodiment of the invention, the dielectric overcoat 35 is an AlN material approximately 1000 Å and the dielectric undercoat layer 32 is an AlN material 100 Å thick. The transparent substrate is a glass material. The memory layer is a $Tb_{25}Fe_{65}Co_{10}$ material approximately 1300 Å thick with a Curie temperature of 225° C. and a compensation temperature of 30° C. The under layer is a $Gd_{35}Fe_{22}Co_{43}$ material approximately 100 Å thick with a Curie temperature of the 350° C. The bias field is $-300$ Oe. For this storage structure, the combined material compensation temperature, $T_{combined}$, is 60° C. and the estimated write temperature, $T_w$, is 200° C. for this bias field.

Figure 4:
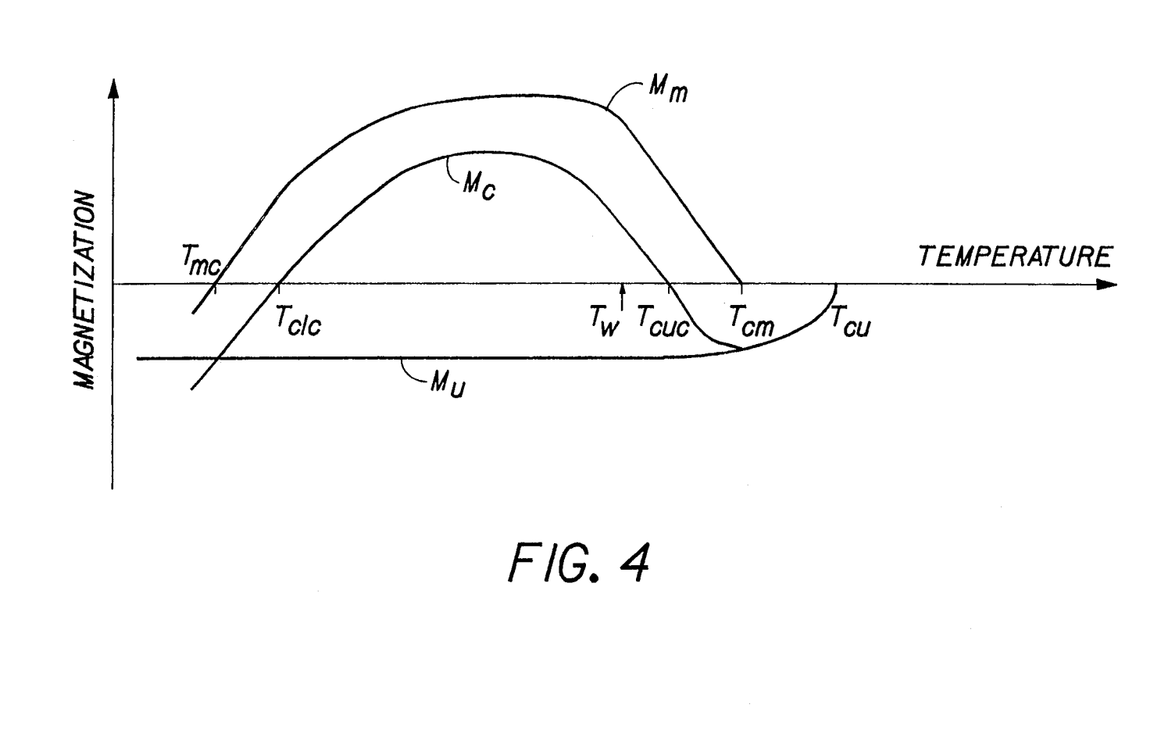
FIG. 4 is a graph illustrating the magnetization of the storage medium of FIG. 4.

Referring to FIG. 4, the magnetization curve of the memory layer, $M_m$, having a Curie temperature, $T_{cm}$, the magnetization curve of the under layer, $M_u$, having a Curie temperature $T_{cu}$, and the combined magnetization curve $M_c$, are shown. The combined magnetization curve, $M_c$, has an upper and lower compensation temperatures, $T_{cuc}$ and $T_{clc}$. These compensation points determine the properties of the storage layer that permit the direct overwrite operation of the storage medium. An approximate location for the write temperature (which must exceed the highest temperature at which the wall motion coercivity is above the bias field) is shown in FIG. 4

Figure 5:
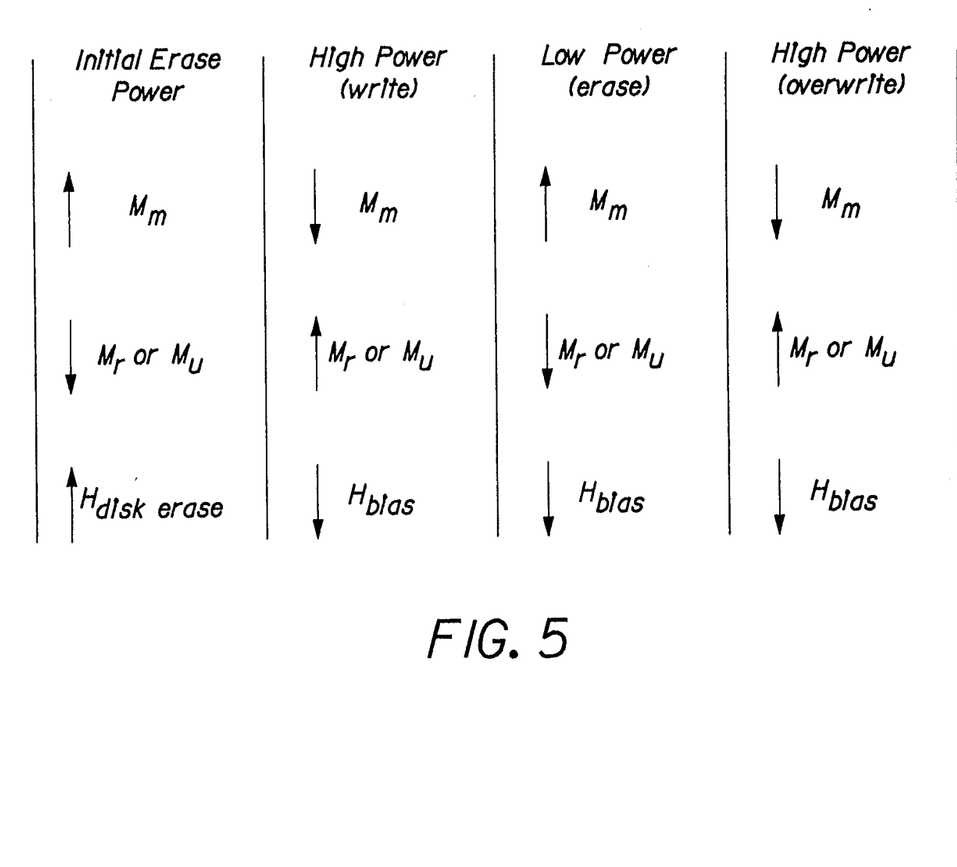
FIG. 5 is a diagram illustrating the write and over-write characteristics of present invention.

Referring next to FIG. 5, the operation of the two embodiments of the present invention are illustrated. With the application of an disk erase field, $H_{disk\ erase}$, and a initial disk erase power radiation source focussed on a region of the memory. structure, the magnetization, $H_{bias}$, of the bias layer has an orientation opposite to that of the disk erase magnetic field, $H_{disk\ erase}$. The initial disk erase power radiation is selected to provide a temperature above the Curie temperatures of the memory layer. For writing and overwriting, high energy radiation in combination with a bias field, $H_{bias}$, (oriented in a direction opposite to the $H_{erase}$) provides an orientation of the magnetization of the reference or under layer, $M_r$ or $M_u$, opposite to the orientation of the bias field, $H_{bias}$. The low power radiation applied to the storage medium in combination with the bias magnetic field, $H_{bias}$, results in the reference or under layer magnetization, $M_r$ or $M_u$, with the same orientation as the bias magnetic field, $H_{bias}$. The orientation of the memory field magnetization, $H_m$, because of the interaction between the memory layer and the bias layer, is determined by the orientation of the reference or under layer. For the materials of the present invention, the media requires a magnetic erase field, $H_{disk\ erase}$, only once, i.e., at the factory. For the material herein disclosed, a magnitude of the disk erase field can be approximately 600 Oe during the heating and cooling of the storage medium.

Figure 6A:
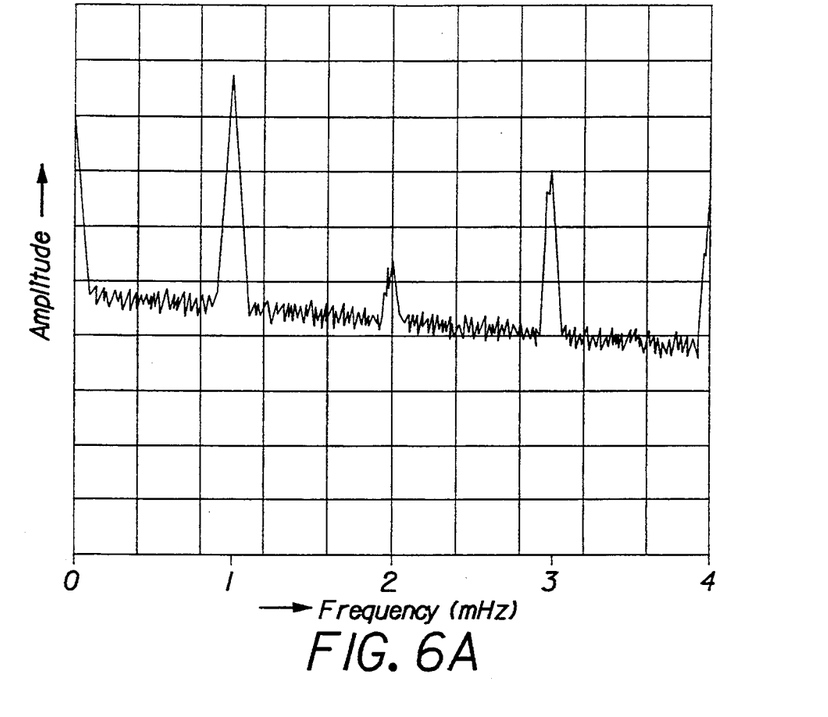
Figure 6B:
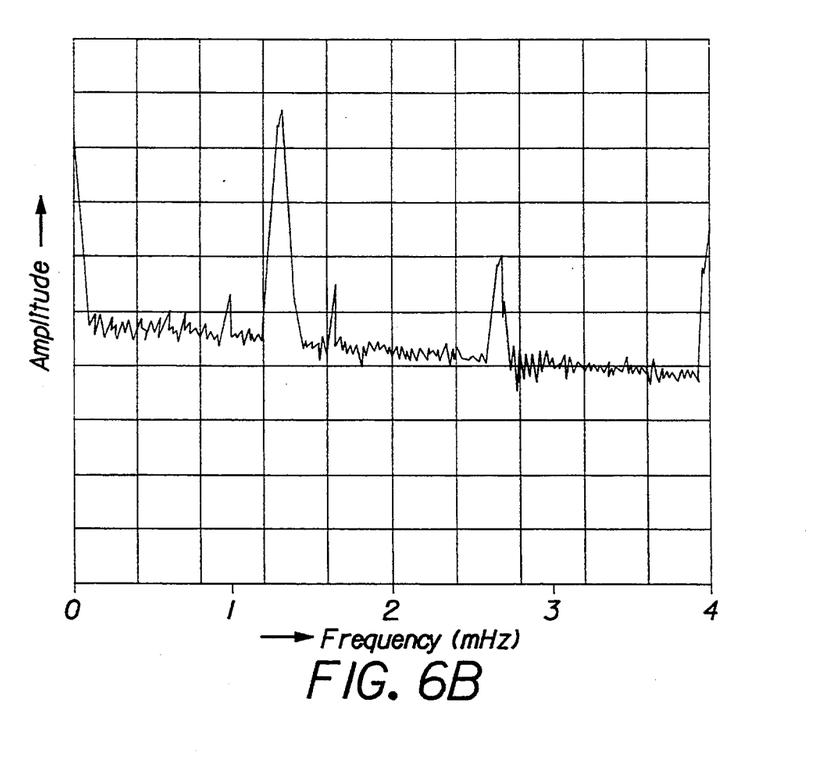
FIG. 6B is a spectrum analyzer plot of the signals read from data overwritten on the same storage medium.

Referring to FIG. 6A and FIG. 6B, spectrum analyzer plots of signals read from a three (magnetic material) layer storage medium, i.e., FIG. 6A, upon which data had been written at a preselected frequency and spectrum analyzer plots for signals read from the same storage medium, i.e., FIG. 6B, upon which original data signals have been overwritten at a different frequency is shown. For the initial writing conditions, a high power laser beam of 15 mw and a low power laser beam of 5 mw with a 1 MHz frequency and a 50% duty cycle were used. The disk was subjected to a bias field of $-400$ Oe. The velocity of the disk is 7 meters/sec. The originally written signals, i.e., at 1 MHz, are shown by the arrow in FIG. 6A, the additional signals being harmonic frequency signals. The overwritten signals were written under the same conditions except that the frequency was 1.3 MHz. The overwritten signals, i.e., at 1.3 MHz, are shown by the arrow in FIG. 6B, the additional signal peaks being harmonic frequency signals. As will be seen by comparison of the two plots, the original signal has been substantially entirely replaced by the overwritten signal.

Figure 7:
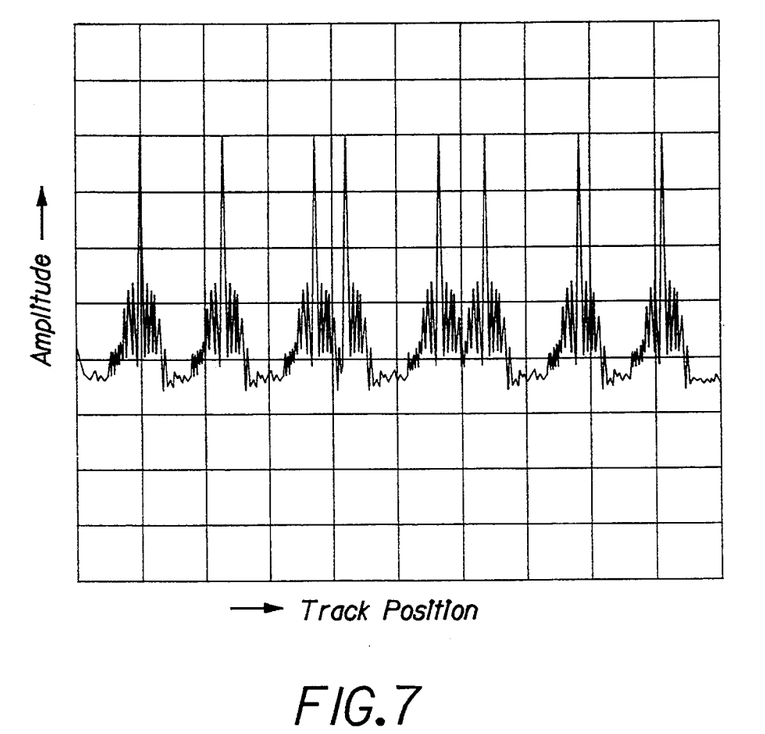
FIG. 7 is a spectrum analyzer plot of data written on the memory layer but read from the reference layer of the three (magnetic material) layer storage medium.

Referring to FIG. 7, the spectrum analyzer plot of the signals tracks written from the memory layer side of the storage medium, but read from the reference layer side of the storage medium are shown. The strong central peak indicates that reference layer and the memory layer are written simultaneously. (The satellite peaks are the result of the misalignment of the storage medium and the laser beam which resulted in reading of multiple tracks).

2. Operation of the Preferred Embodiment

The ability to provide a direct overwrite of magneto-optical medium of the two embodiments is determined, in the present invention, by the combined magnetization properties of the memory and the other layers. The relationship between the memory and the reference or the under layers is determined by exchange coupling. In the three (magnetic material) layer embodiment, the exchange coupling is mediated by the intermediate layer having a relatively small anisotropy. In the two (magnetic material) layer embodiment, the memory layer and the under layer are directly exchange coupled. As a result of the coupling between the reference or under layers and the memory layers in combination with the magnetic properties of these layers and the intermediate layer, combined compensation temperatures, indicated as $T_{clc}$ and $T_{cuc}$ in FIG. 2 and FIG. 4, is provided.

The operation of the storage layer involves varying the power of the radiation incident on the storage structure in the presence of an external bias magnetic field, the incident radiation being used to heat the storage structure. In the presence of the external magnetic field, the heating of the structure or region thereof above the write temperature, $T_w$, and cooling the material will result in the orientation of the memory layer in a first direction, of FIG. 5. However, when the structure is heated to a temperature in a range that falls below the write temperature, $T_w$, and in the region near the lower combined compensation temperature, $T_{clc}$, in the presence of an external field, the memory layer will have a second magnetic orientation after cooling. This controllable orientation provides a mechanism which can be used to overwrite magnetic domains which had been previously oriented.

While the structure of the storage medium has been described with reference to a specific embodiments, this storage medium is typically implemented in the form of an optical disk. However, other implementations of the storage medium such as tape can advantageously use the present invention.

Independent experiments have been conducted which indicate that the memory layer and the bias layer are oriented simultaneously as is demonstrated by FIG. 7. Additional experiments, illustrated by FIG. 6A and FIG. 6B demonstrate that the overwritten data substantially completely replaces the originally written data.

It will be now appreciated that there has been presented a storage medium for which regions of magnetic orientation can be unambiguously identified, the regions of magnetic orientation being in the memory layer, but accessed for purposes of writing data into the storage medium through interaction with the reference layer, the reference layer interacting with the memory layer through the intermediate layer.

Viewed in another manner the operation of the storage medium can be understood in the following manner. The storage medium will require a complete erasure only once, presumably at the factory before actual use. The complete erasure is performed by heating the entire storage medium and cooling the storage medium during exposure to a field of (+) 600 Oe. A temperature, $T'_w$, is the highest temperature for which the wall motion coercivity of the multi-layer medium exceeds the bias magnetic field. This temperature, $T'_w$, is the lower bound for the write temperature for writing on the disk. The combined lower compensation temperature, $T_{clc}$, is above the ambient operating temperature, but below the temperature, $T'_w$. The preferred operation occurs when the combined lower compensation temperature, $T_{clc}$, is approximately half way between the ambient temperature and the temperature, $T'_w$. The energy of the write laser pulse is selected so that the signal is recorded on both the memory layer and the reference or under layer of the storage structure. In the embodiment having the three magnetic material layers, the intermediate layer is sufficiently thin so that the hysteresis loop of the reference and memory layers mutually interact. (By way of specific example, in the second example of the first embodiment described above, the intermediate layer of $Gd_{35}Fe_{26}Co_{39}$ should have a thickness less than 150 Å). The energy of the laser radiation in the erase mode (medium power mode) is selected to be less than the power required for the write of operation, but greater than the read mode of operation. The laser power for the erase power mode is typically selected to be midway between the laser poser for the write mode and the laser power for the erase mode, however, the laser power for the erase mode is a function of the bias magnetic field and other parameters. The coercivity of the memory layer should be high at room temperature, meaning that the compensation temperature of this layer should be near room temperature. Finally, the storage medium layers surrounding the magneto-optical layers should have similar or smaller in-plane thermal conductivities, thereby eliminating several materials.

While the invention has been described with reference to storage media relying on the Kerr effect, it is apparent that the invention is easily adapted to other devices which can identify the orientation of magnetic domains. Similarly, while the invention has been described with particular reference to two embodiments of the storage medium, it will be understood by those skilled in the art that various changes may be made and equivalents may be substituted for elements of the preferred embodiment without departing from invention. In addition, many modifications may be made to adapt a particular situation and material to the teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A magneto-optical structure for the storage and retrieval of information, said structure being capable of direct overwrite without requiring an initializing field, said structure comprising:

a magnetically orientable memory layer;

a magnetically orientable reference layer, said reference layer having a Curie temperature less than or approximately equal to a Curie temperature of said memory layer, said memory layer having substantially higher room temperature coercivity than said reference layer; and an intermediate layer positioned between said memory layer and said reference layer, said intermediate layer having a relatively low anisotropy, said intermediate layer having a Curie temperature substantially higher than said reference layer Curie temperature and said memory layer Curie temperature, said intermediate layer mediating a magnetic interaction between said reference layer and said memory layer, said interaction between said memory layer and said reference layer providing for a controllable and coupled orientation of said memory and reference 25 layers.

2. The magneto-optical structure of claim 1 wherein said magneto-optical structure has an equilibrium operating temperature, and a low and a high combined compensation temperature, said low combined compensation temperature being higher than the magneto-optical structure equilibrium operating temperature.

3. The magneto-optical structure of claim 2 wherein said low combined compensation temperature is below the highest temperature at which a wall motion coercivity of said magneto-optical structure exceeds a bias magnetic field.

4. The magneto-optical structure of claim 3 wherein said magneto-optical structure has a write temperature for selectively orienting magnetic regions of said magneto-optical structure in a presence of a bias magnetic field, said write temperature having a lower bound at the highest temperature at which the wall motion coercivity of said magneto-optical structure is greater than said bias magnetic field.

5. The magneto-optical structure of claim 4 wherein, in a presence of a magnetic field generally perpendicular to surfaces of said layer, application of radiation resulting in a structure temperature in a preselected region above said write temperature providing a first magnetic orientation of said memory layer and wherein application of radiation resulting in a structure temperature in a temperature range intermediate said write temperature and an operating temperature provides a second magnetic orientation of said memory layer.

6. The magneto-optical structure of claim 4 wherein said memory layer is comprised of an alloy of TbFeCo and said reference layer is comprised of an alloy of TbFeCoZr.

7. The magneto-optical structure of claim 4 wherein said memory layer is comprised of an alloy of TbFeCoZr and said reference layer is comprised of an alloy of TbFeCo.

8. The magneto-optical structure of claim 4 wherein said memory and said reference layer are comprised of alloys of TbFeCoZr.

9. The magneto-optical structure of claim 4 wherein said intermediate layer is comprised of an alloy of GdFeCo.

10. The magneto-optical structure of claim 4 wherein an initializing magnet is not used in operation of said magneto-optical structure.

11. The magneto-optical structure of claim 4 wherein heating of preselected regions of said magneto-optical structure is performed by a radiation beam.

12. A magneto-optical storage structure comprising:
a magnetically orientable memory layer; and
a magnetically orientable under layer, said under layer having a Curie temperature above a memory layer Curie temperature, a room temperature coercivity of said memory layer being higher than a room temperature coercivity of said under layer, said under layer having a relatively small anisotropy, a magnetic interaction between said memory layer and said under layer providing a controllable and coupled orientation of said two layers.

13. The magneto-optical storage structure of claim 12 wherein said magneto-optical structure has an equilibrium operating temperature, and a low and a high combined compensation temperature, said low combined compensation temperature being higher than the magneto-optical structure equilibrium operating temperature.

14. The magneto-optical storage structure of claim 13 wherein said low combined compensation temperature is below the highest temperature at which a wall motion coercivity of said magneto-optical structure exceeds a bias magnetic field.

15. The magneto-optical storage structure of claim 14 wherein said magneto-optical structure has a write temperature for selectively orienting magnetic regions of said magneto-optical structure in a presence of a bias magnetic field, said write temperature having a lower bound at the highest temperature at which the wall motion coercivity of said magneto-optical structure is greater than said bias magnetic field.

16. The magneto-optical structure of claim 15 wherein, in a presence of a magnetic field generally perpendicular to surfaces of said layer, application of radiation resulting in a structure temperature in a preselected region above said write temperature providing a first magnetic orientation of said memory layer and wherein application of radiation resulting in a structure temperature in a temperature range intermediate said write temperature and an operating temperature provides a second magnetic orientation of said memory layer.

17. The magneto-optical structure of claim 15 wherein said memory layer is comprised of an alloy of TbFeCo and said under layer is comprised of an alloy of GdFeCo.

18. The magneto optical structure of claim 15 wherein an intializing magnet is not required for operation of said magneto-optical storage structure.

19. The magneto-optical structure of claim 15 wherein heating of preselected regions of said magneto-optical structure is performed by a radiation beam.

20. The method of providing a magneto-optical storage structure which does not require an initializing magnet, said method comprising the steps of:
fabricating a memory layer of a magnetic material having a compensation point and a Curie temperature; and
positioning an under layer of magnetic material exchange-coupled with said memory layer proximate said memory layer, said under layer having a Curie temperature above said memory layer Curie temperature, said memory layer having a room temperature coercivity higher than a room temperature coercivity of said under layer, wherein magnetic properties of said memory layer and said under layer provide a write temperature in a presence of a bias magnetic field, said memory layer having a first orientation when said structure is heated above said write temperature in a preselected region in a presence of said bias magnetic field, said memory layer having a second orientation when said structure is heated to a temperature range intermediate said write temperature and an operating temperature in a presence of said bias field, a magnetic exchange interaction between said memory layer and said under layer providing a controllable and a coupled magnetic orientation for these layers.

21. The method of providing a magneto-optical structure of claim 20 further comprising a step of selecting said write temperature to be greater than a temperature wherein a wall motion coercivity of said combined magneto-optical storage structure is equal to said bias field.

22. A method of providing a magneto-optical storage structure which does not require an initializing magnetic field, said method comprising the steps of:
providing a intermediate layer of magnetic material having a relatively low anisotropy and a Curie temperature;
positioning a memory layer of magnetic material on a first side of said intermediate layer, said memory layer having a Curie temperature, said memory layer having a compensation temperature; and
positioning a reference layer of magnetic material on a second side of said intermediate layer, said intermediate layer having higher Curie temperature than said reference layer Curie temperature and said memory layer Curie temperature, said memory layer having a Curie temperature higher than or approximately equal to said reference layer Curie temperature, said memory layer having a higher room temperature coercivity than said reference layer, wherein a combined magnetization of said memory layer and said reference layer along with said intermediate layer has an upper and a lower combined compensation point temperature and a write temperature, wherein heating said structure to a temperature range intermediate said write temperature and an operating temperature in the presence of a bias magnetic field results in a first magnetization orientation of said memory layer, wherein heating said structure above said write temperature in a preselected region in a presence of said bias magnetic field results in a second magnetization orientation said intermediate layer mediating a magnetic exchange interaction between said memory layer and said reference layer providing a controllable and a coupled magnetic orientation for these layers.

23. The method of providing a magnet-optical storage structure of claim 22 further comprising a step of:

selecting said write temperature to a temperature at which a combined wall motion coercivity of said storage structure is less than said bias magnetic field.

* * * * *